US010054206B2

(12) United States Patent  
Gurney

(10) Patent No.: US 10,054,206 B2  
(45) Date of Patent: Aug. 21, 2018

(54) TURBINE SHELL WITH INTEGRATED STIFFENING ELEMENTS

(71) Applicant: Schaeffler Technologies AG & Co. KG, Herzogenaurach (DE)

(72) Inventor: Nigel Gurney, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 701 days.

(21) Appl. No.: 14/656,188

(22) Filed: Mar. 12, 2015

(65) Prior Publication Data

US 2015/0267795 A1 Sep. 24, 2015

Related U.S. Application Data

(60) Provisional application No. 61/968,077, filed on Mar. 20, 2014.

(51) Int. Cl.
*F16H 45/02* (2006.01)  
*F16H 41/24* (2006.01)  
*F16H 41/28* (2006.01)

(52) U.S. Cl.
CPC ............ *F16H 41/24* (2013.01); *F16H 41/28* (2013.01); *F16H 45/02* (2013.01); *F16H 2045/0205* (2013.01); *F16H 2045/0278* (2013.01)

(58) Field of Classification Search
CPC .... F16H 2041/243; F16H 41/28; F16H 41/24; F16H 45/02; F16H 2041/285
See application file for complete search history.

(56) References Cited

U.S. PATENT DOCUMENTS

| 5,065,509 A | * | 11/1991 | Sahashi ................ F16H 41/28 29/889.21 |
| 6,866,130 B2 | * | 3/2005 | Kuwahara ............ F16H 45/02 192/212 |
| 2007/0161483 A1 | | 7/2007 | Raf |
| 2008/0093867 A1 | | 4/2008 | Glasgow et al. |

FOREIGN PATENT DOCUMENTS

EP          1800840 A1      6/2007

* cited by examiner

*Primary Examiner* — F. Daniel Lopez  
*Assistant Examiner* — Abiy Teka  
(74) *Attorney, Agent, or Firm* — Brooks Kushman P.C.

(57) ABSTRACT

A torque converter having an input means and an output means, comprising a cover non-rotatably connected to the input means, an impeller having an impeller shell non-rotatably connected to the cover, the impeller also having at least one blade fixedly secured to the impeller shell, a stator having at least one blade fixedly secured thereto, and, a turbine having a turbine shell non-rotatably connected to the output means, the turbine shell comprising a first profile having at least one blade fixedly secured thereto, and a second profile arranged concentrically within the first profile, the second profile comprising at least one integrated stiffening element.

20 Claims, 6 Drawing Sheets

TURBINE SHELL WITH INTEGRATED STIFFENING ELEMENTS

CROSS-REFERENCE TO RELATED APPLICATIONS

This application claims the benefit under 35 U.S.C. § 119(e) of U.S. Provisional Patent Application No. 61/968,077, filed Mar. 20, 2014, which application is incorporated herein by reference in its entirety.

FIELD OF THE INVENTION

The invention relates generally to a torque converter and, more specifically, to a turbine shell with integrated stiffening elements.

BACKGROUND OF THE INVENTION

A torque converter is used to transfer torque from an engine to a transmission in a motor vehicle. The torque converter includes a turbine having an impeller and a turbine, which are engaged by a fluid, so that the rotating impeller drives the turbine. To minimize power losses at high rotational speeds, a clutch is also provided, in order to engage the rotation of the impeller to the output means when needed. The transfer of torque takes place during acceleration of the motor vehicle through the hydrodynamic coupling of the turbine with the impeller, and during normal driving operation through the mechanical coupling of the converter clutch.

During operation, the turbine shell deflects due to forces generated by the fluid moving between the turbine and impeller. If the turbine deflection is high enough while the turbine is subjected to rotational forces, the turbine assembly can contact the blades of the impeller and cause a catastrophic failure due to the differences in rotational speeds between the turbine and impeller. Obviously, this should be avoided.

One way to avoid this problem is to stiffen the turbine shell by using a brazing process. Brazing is a metal joining process where a filler metal is melted and placed between two parts by capillary action. This brazing technique not only adds cost to production, but also unwanted weight to the turbine, which affects the overall performance of the torque converter.

Another way to stiffen the turbine shell is disclosed in United States Patent Application Publication No. 2007/0161483 (Raf) and discloses a method for manufacturing a stiffening element of composite material. The stiffening member comprises a web, at least one flange, and a radius of curvature corresponding to the curvature of the curved shell surface that is supported by the composite stiffening member. Raf fails to disclose or teach, however, a stiffening element that can be integrated into a curved shell surface but rather discloses methods of manufacturing a stiffening member of supporting curved shell surface from either side of the shell.

Thus, there exists a long felt need for a turbine shell with integrated stiffening elements for the turbine of a torque converter.

BRIEF SUMMARY OF THE INVENTION

The present invention broadly includes a torque converter having an input means and an output means comprising a cover non-rotatably connected to the input means, an impeller having an impeller shell non-rotatably connected to the cover, the impeller also having at least one blade fixedly secured to the impeller shell, a stator having at least one blade fixedly secured thereto, and, a turbine having a turbine shell non-rotatably connected to the output means, the turbine shell comprising an outer profile having at least one blade fixedly secured to the first profile, and, an inner profile arranged concentrically within the outer profile, the inner profile comprising at least one integrated stiffening element.

A general object of the invention is to provide a torque converter having a turbine shell with integrated stiffening elements which minimize the deflection of component parts.

These and other objects, features and advantages of the present invention will become readily apparent upon a reading and review of the following detailed description of the invention, in view of the appended drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention as claimed.

Unless defined otherwise, all technical and scientific terms used herein have the same meaning as commonly understood to one of ordinary skill in the art to which this invention pertains. It should be understood that any methods, devices or materials similar or equivalent to those described herein can be used in the practice or testing of the invention.

By "non-rotatably connected" first and second components we mean that the first component is connected to the second component so that any time the first component rotates, the second component rotates with the first component, and any time the second component rotates, the first component rotates with the second component. Axial displacement between the first and second components is possible.

Figure 1A:
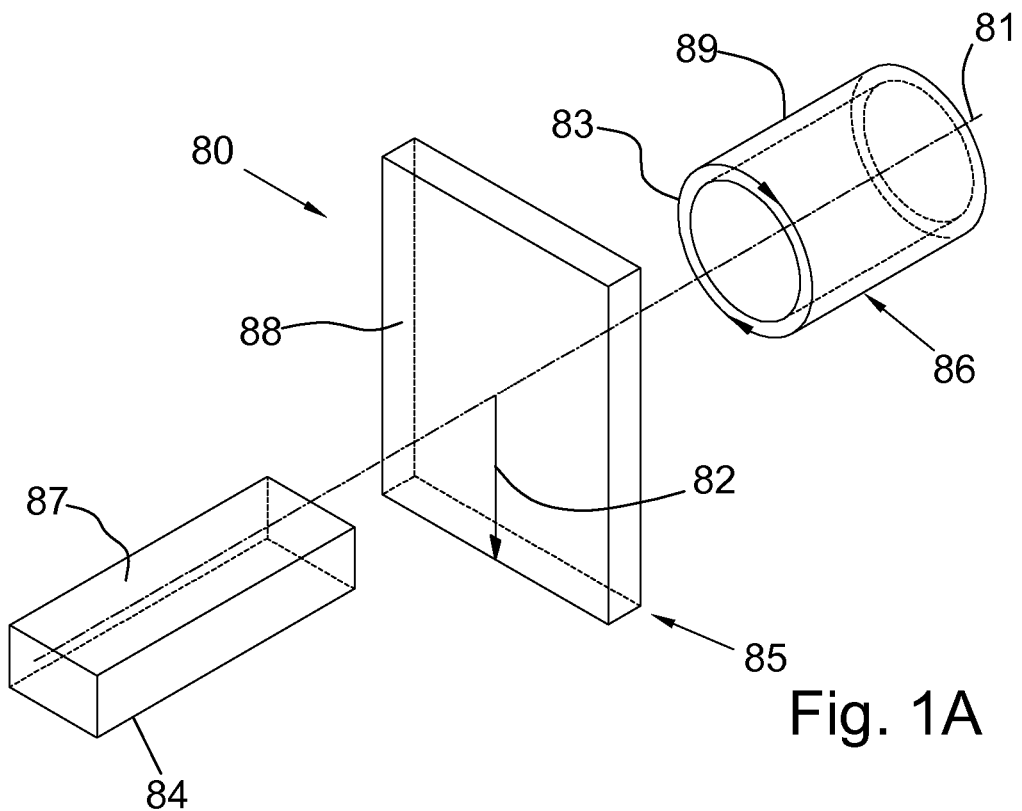
FIG. 1A is a perspective view of a cylindrical coordinate system demonstrating spatial terminology used in the present patent.

FIG. 1A is a perspective view of cylindrical coordinate system 80 demonstrating spatial terminology used in the present patent. The present invention is at least partially described within the context of a cylindrical coordinate system 80. System 80 has a longitudinal axis 81, used as the reference for the directional and spatial terms that follow. Axial direction AD is parallel to axis 81. Radial direction RD is orthogonal to axis 81. Circumferential direction CD is defined by an endpoint of radius R (orthogonal to axis 81) rotated about axis 81.

To clarify the spatial terminology, objects 84, 85, and 86 are used. Surface 87 of object 84 forms an axial plane. For example, axis 81 is congruent with surface 87. Surface 88 of object 85 forms a radial plane. For example, radius 82 is congruent with surface 88. Surface 89 of object 86 forms a circumferential surface. For example, circumference 83 is congruent with surface 89. As a further example, axial movement or disposition is parallel to axis 81, radial movement or disposition is orthogonal to axis 82, and circumferential movement or disposition is parallel to circumference 83. Rotation is described herein with respect to axis 81.

The adverbs "axially," "radially," and "circumferentially" are with respect to an orientation parallel to axis 81, radius 82, or circumference 83, respectively. The adverbs "axially," "radially," and "circumferentially" are used with respect to an orientation parallel to respective planes.

Figure 1B:
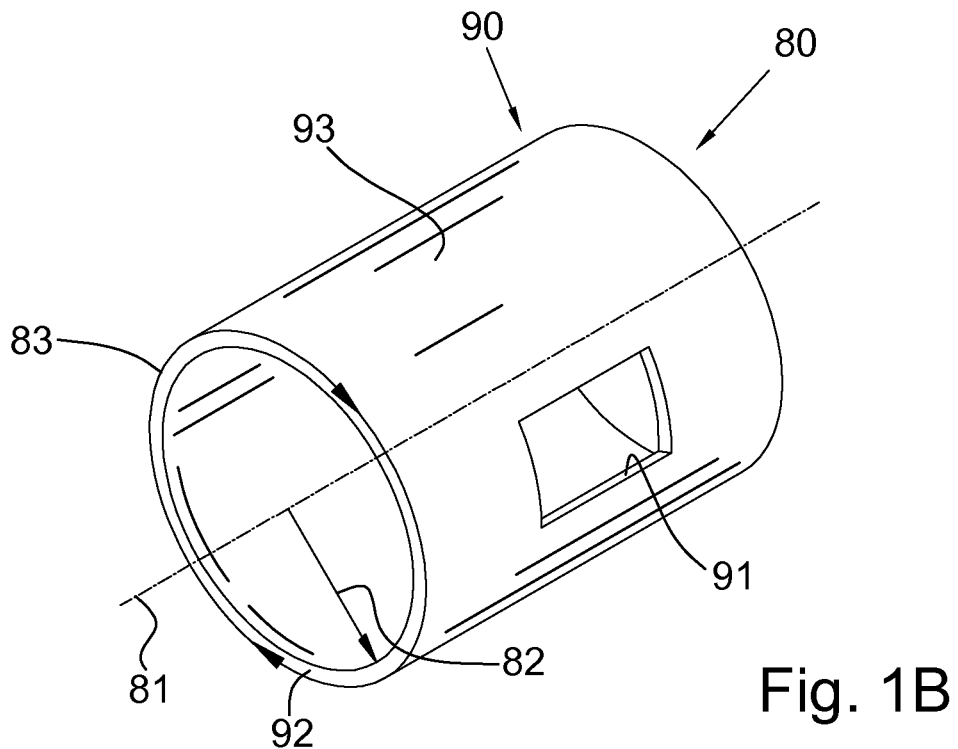
FIG. 1B is a perspective view of an object in the cylindrical coordinate system of FIG. 1a demonstrating spatial terminology used in the present patent.

FIG. 1B is a perspective view of object 90 in cylindrical coordinate system 80 of FIG. 1A demonstrating spatial terminology used in the present patent. Cylindrical object 90 is representative of a cylindrical object in a cylindrical coordinate system and is not intended to limit the claims of the present invention in any manner. Object 90 includes axial surface 91, radial surface 92, and circumferential surface 93. Surface 91 is part of an axial plane; surface 92 is part of a radial plane, and surface 93 is part of a circumferential plane.

Figure 2:
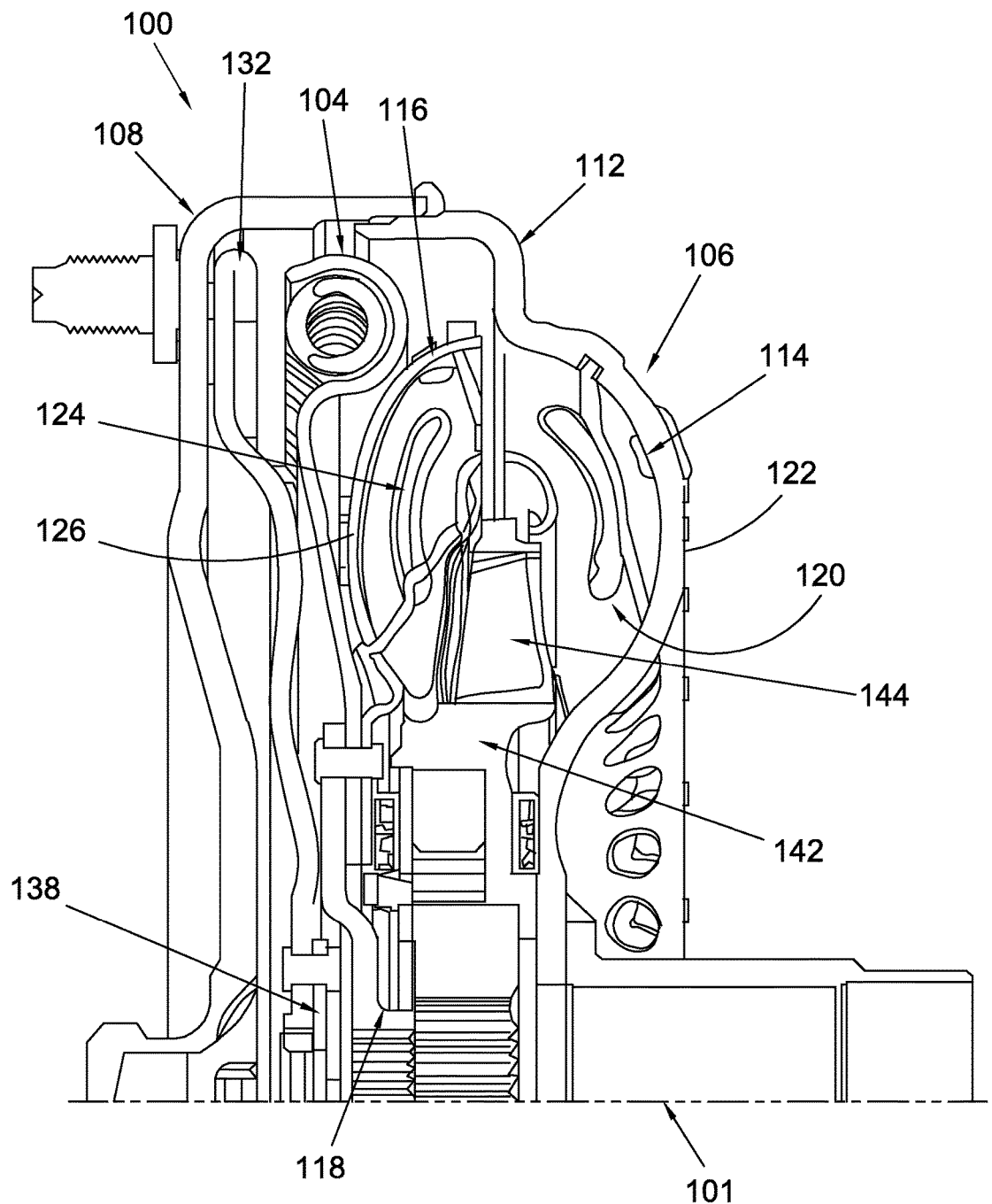
FIG. 2 is a partial cross-sectional view of a torque transmission apparatus.

FIG. 2 is a partial cross-sectional view of torque transmission apparatus 100. Apparatus 100 includes vibration damper 104 and torque converter 106. Damper 104 includes cover 108 arranged to receive torque from an engine. Torque converter 106 includes cover 112 non-rotatably connected to cover 108, impeller 114, turbine 116, and output hub 118. As seen in the figure, cover 108, impeller 114, turbine 116, and output hub 118 are axially arranged along axis of rotation 101. Impeller 114 includes at least one blade 120 and impeller shell 122 non-rotatably connected to cover 108. Turbine 116 includes at least one blade 124 and turbine shell 126. Operatively arranged between impeller 114 and turbine 116 is stator 142 including at least one blade 144. Stator 142 influences the flow of fluid passing from turbine 116 to impeller 114, increasing the force that the fluid applies to blade 120 fixedly secured to impeller shell 122.

In an example embodiment, torque converter 106 includes torque converter clutch 132. At low rotational speeds when torque multiplication is needed, clutch 132 does not engage cover 108. At high rotational speeds though, when the rotational speed of turbine 116 is almost that of impeller 114, clutch 132 engages cover 108, which allows for a direct connection between an engine and a transmission for torque transfer. When clutch 132 engages cover 108, hub 138 non-rotatably connects to cover 108 via clutch 132.

Figure 3:
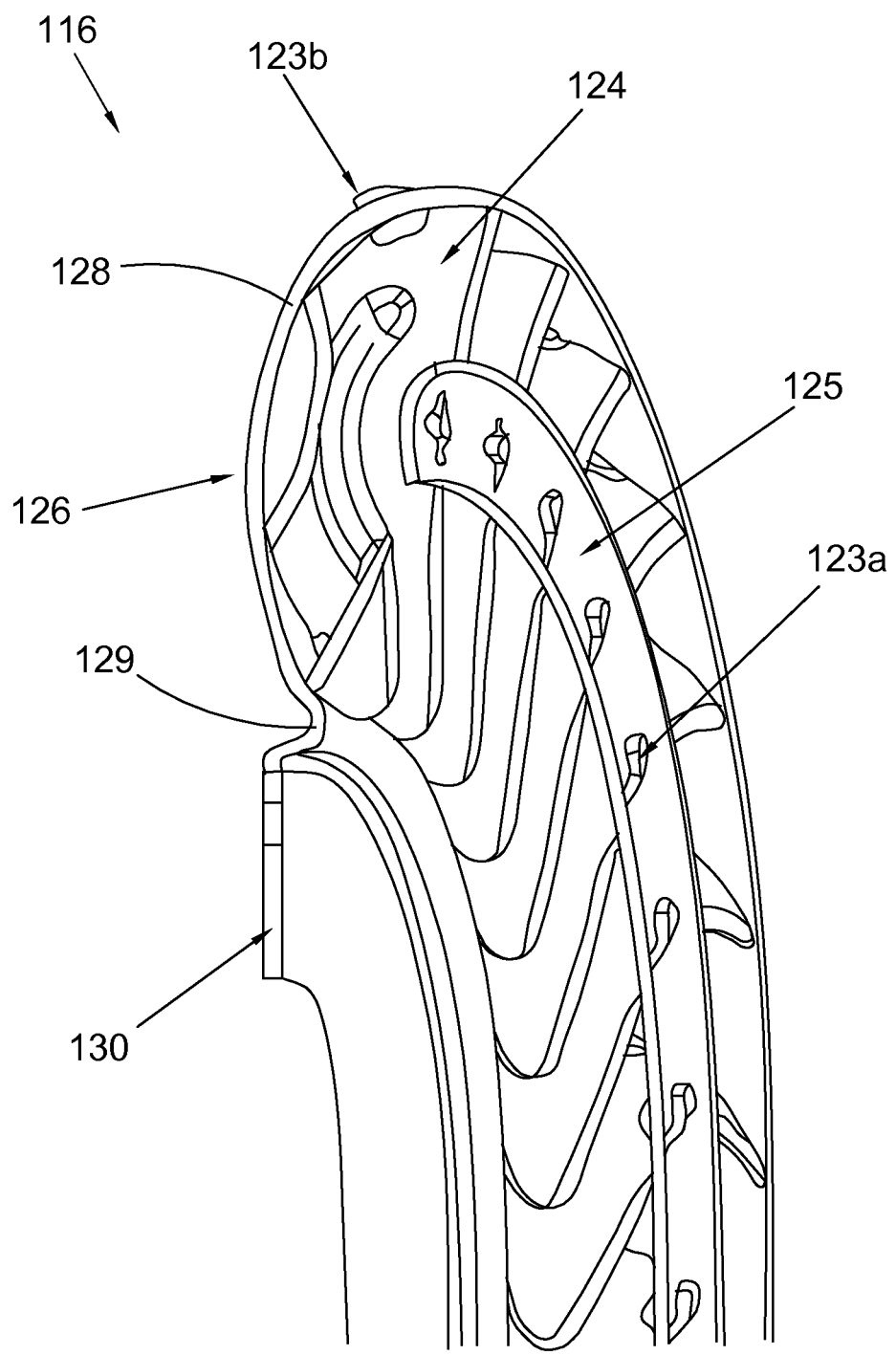
FIG. 3 is an enlarged partial perspective view of a turbine.

FIG. 3 is an enlarged partial perspective view of turbine 116. Blades 124 are fixedly secured to turbine shell 126 and core 125 via tab 123a and tab 123b. The shape and size of the blades 124 are based on the limitations of outer profile 128. In an example embodiment, outer profile 128 can be of an arcuate design such as a semicircle or elongated semicircle. Inner profile 129 is concentrically arranged within outer profile 128 and provides axial and radial support between mounting hub 130 and outer profile 128. Mounting hub 130 engages turbine 116 via output hub 118, which connects to an output means (shown in FIG. 2) Inner profile 129 is designed in such a way that it provides support for turbine shell 126 while in operation due to the high fluid forces generated within the torus of torque converter 106. Due to these fluid forces, outer profile 128 can move in an axial direction towards impeller shell 122 and make contact, causing a catastrophic failure within torque converter 106 due to the different rotational speeds of turbine 116 and impeller 114.

Figure 4:
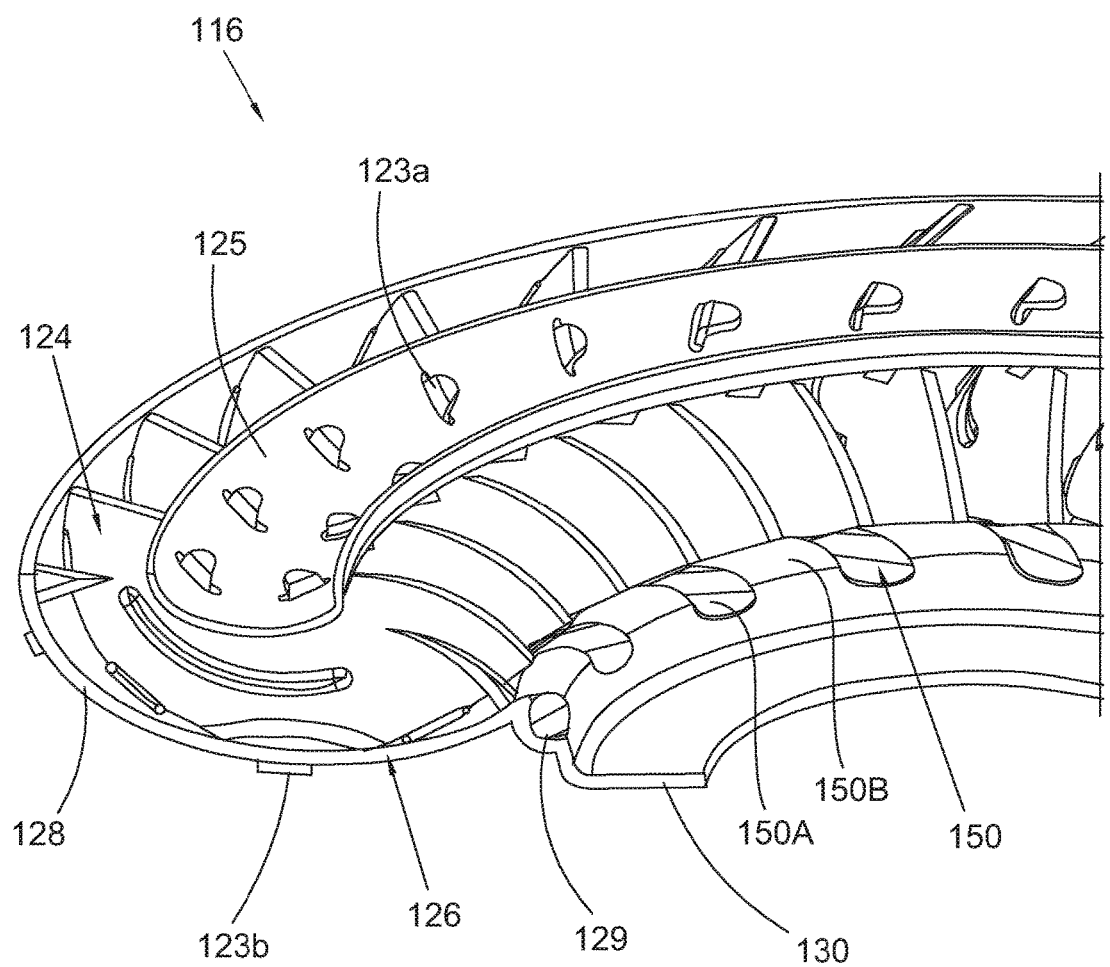
FIG. 4 is an enlarged partial perspective view of the turbine shown in FIG. 3 but modified to include integrated stiffening elements.

In order to prevent or reduce an unwanted deflection of turbine 116 while in operation, stiffening elements 150 are integrated into inner profile 129 to provide increased radial and axial support as seen in FIG. 4. In a preferred embodiment, stiffening elements 150 are arranged in a symmetrical pattern, radially extending outwardly from mounting hub 130 towards outer profile 128. The design of stiffening elements 150 interrupts the smooth contoured surface of inner profile 129, which could be susceptible to deflection due to a lack of radial strength, and form an inner profile 129 that comprises surfaces that are orthogonal to one another, creating stiffening elements 150. Stiffening elements 150 are essentially indentations formed in inner profile 129. When turbine shell 126 is formed, a piece of sheet metal is stamped thereby forming mounting hub 130, outer profile 128, and inner profile 129. In the same stamping process, stiffening elements 150 are stamped into inner profile 129. When stiffening elements 150 are stamped into inner profile 129, a series of channels or indentations 150A and ribs 150B are formed. This ribbed pattern provides added strength to turbine 116.

Figure 5:
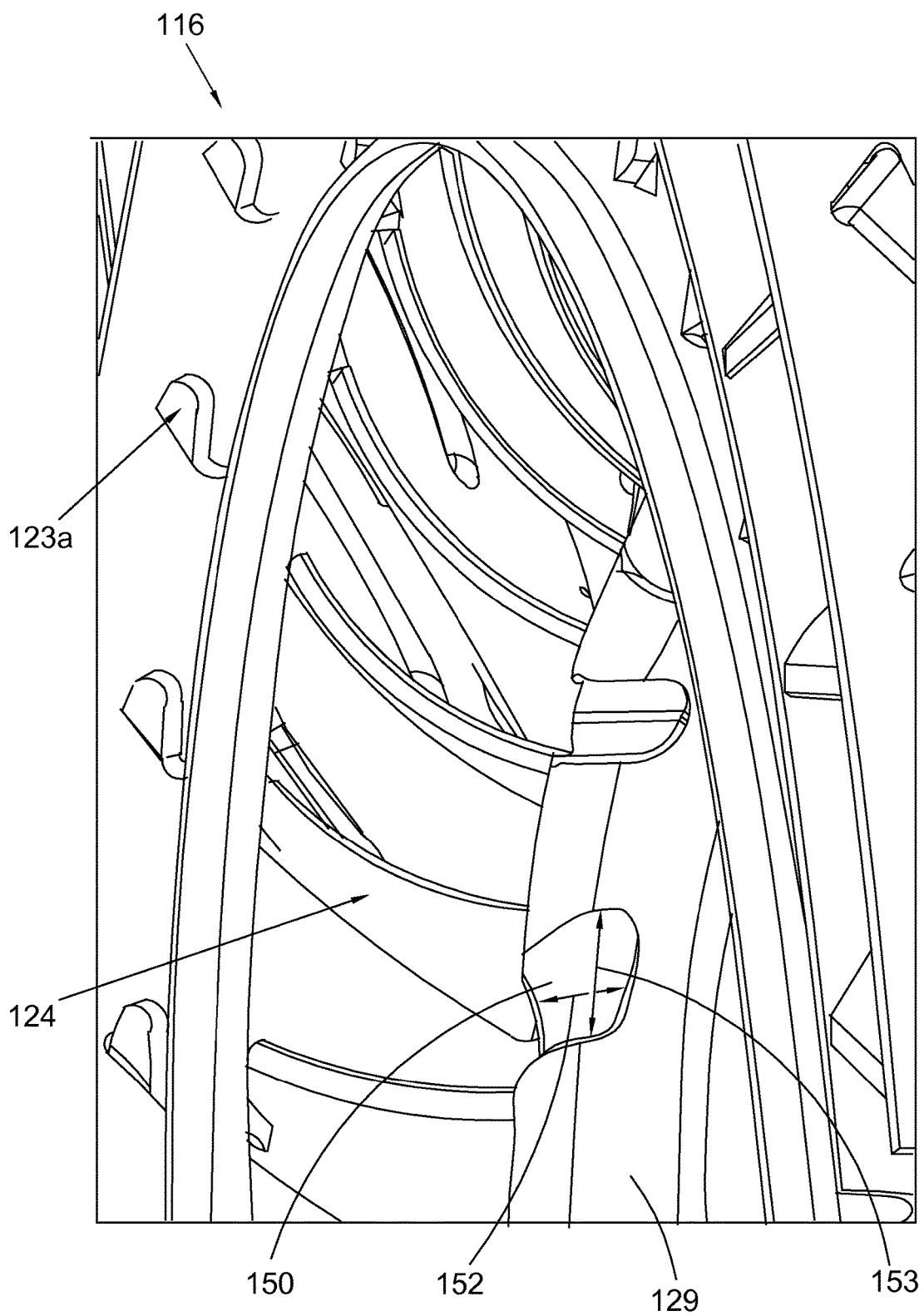
FIG. 5 is an enlarged partial perspective view of the integrated stiffening elements of the invention within a turbine; and, FIG. 6 is an enlarged partial rear perspective view of a turbine with integrated stiffening elements.

Stiffening elements 150 have a height 152 and width 153 (as shown in FIG. 5), which are dependent on the thickness of turbine 116 and inner shell profile 129. FIG. 5 is an enlarged perspective view of turbine 116 with stiffening elements 150. As seen in the figure, stiffening elements 150 are of a contoured shape to help prevent stress concentrations that generate at sharp angle changes. The contour shape of stiffening elements 150 helps distribute the forces that are acting on turbine 116 and helps prevent excessive deflection of turbine 116.

Figure 6:
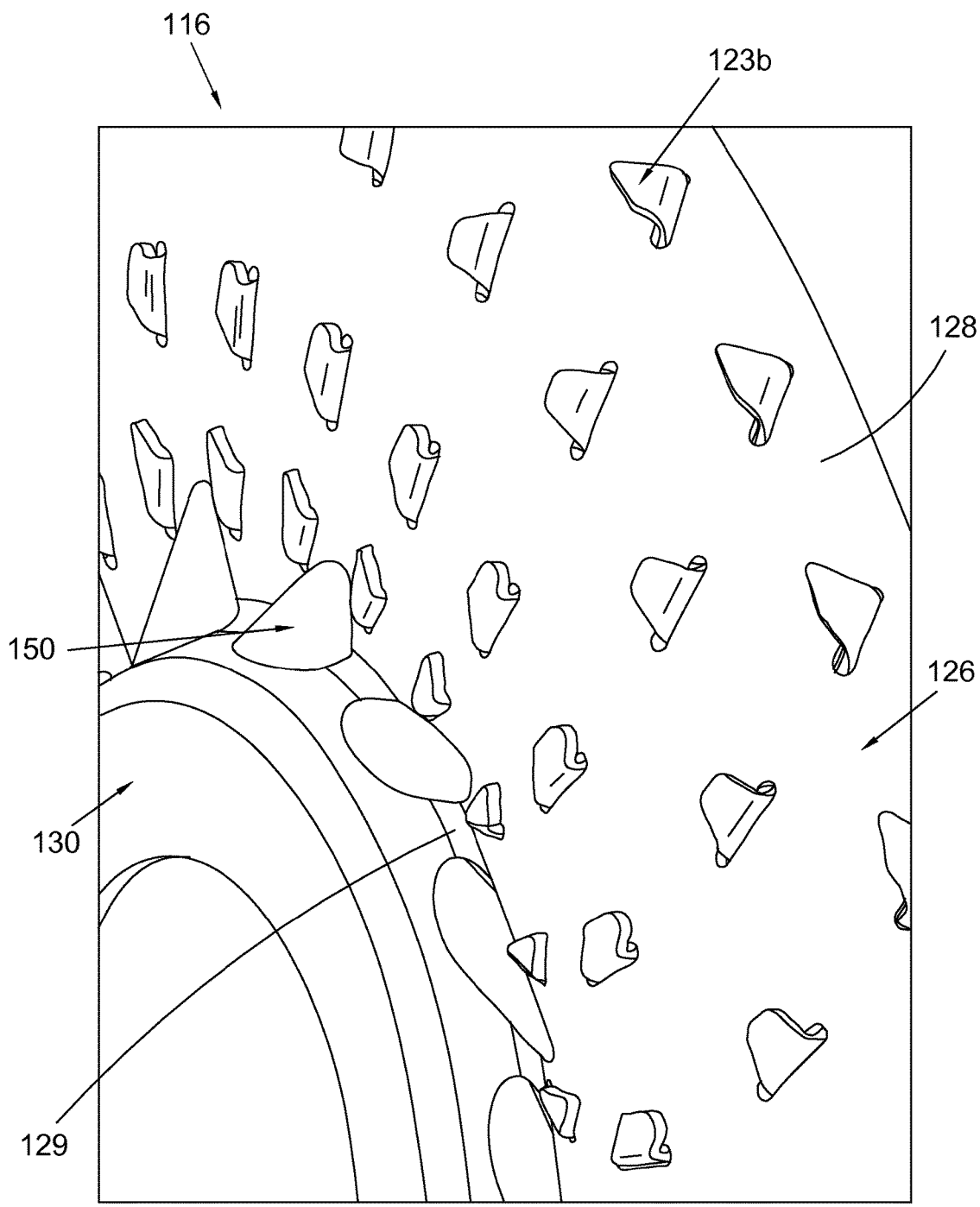

FIG. 6 is an enlarged rear partial perspective view of turbine 116 with stiffening elements 150. As shown in the figure, stiffening elements 150 extend from mounting hub 130, through inner profile 129, and merge with turbine shell 126. Stiffening elements 150 are fixedly secured to outer profile 128 while also being integrated within inner profile 129 to prevent excessive deflection. It is important to note that if turbine shell 126 were to have a thicker cross-section, stiffening elements 150 would be designed with a different height 152 and width 153, or the number of stiffening elements 150 integrated within inner profile 129 could vary as necessary to provide sufficient support.

In a first embodiment, thus it is seen that stiffening of turbine shell 126 can be achieved by integrating stiffening elements 150 within inner profile 129 without the need for brazing turbine 116. Instead, a stamping process is used to form metal into the shape of turbine 116. In the same stamping process for forming turbine 116, stiffening elements 150 are formed from the same stamping die.

In another embodiment, stiffening of turbine shell 126 can be achieved by integrating stiffening elements 150 within inner profile 129 while also brazing turbine 116. This combination of integrating stiffening elements 150 and brazing allows for thinning of turbine shell 126, giving torque converter 106 less rotational inertia and less manufactured materials.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

80 system
81 longitudinal axis
82 radius
83 circumference
84 object
85 object
86 object
87 surface
88 surface
89 surface
90 object
91 axial surface
92 radial surface
93 surface
100 torque transmission apparatus
101 axis of rotation
104 damper
106 torque converter
108 cover
112 cover
114 impeller
116 turbine
118 output hub
120 blade
122 impeller shell
123*a* tab
123*b* tab
124 blade
125 core
126 turbine shell
128 outer profile
129 inner profile
130 mounting hub
132 clutch
138 hub
142 stator
144 blade
150 stiffening elements
150A channels
150B ribs
152 height
153 width

What I claim is:

1. A torque converter having an input means and an output means, comprising:
a cover non-rotatably connected to said input means;
an impeller having an impeller shell non-rotatably connected to said cover, said impeller also having at least one blade fixedly secured to said impeller shell;
a stator having at least one blade fixedly secured thereto; and,
a turbine having a turbine shell non-rotatably connected to said output means, said turbine shell comprising:
an outer profile having at least one blade fixedly secured thereto; and,
an inner profile arranged concentrically within said outer profile, said inner profile comprising at least one integrated stiffening element formed therein.

2. The torque converter as recited in claim 1, wherein said turbine is manufactured as a single stamped part.

3. The torque converter as recited in claim 1, wherein said integrated stiffening element is formed as a channel having a smooth contoured design.

4. The torque converter as recited in claim 1, wherein said integrated stiffening element is formed as a channel extending radially outward within said inner profile.

5. The torque converter as recited in claim 3, wherein said channel extends radially outward in a circumferential pattern.

6. The torque converter as recited in claim 1, wherein said blade of said outer profile engages said outer profile by bent tabs.

7. The torque converter as recited in claim 6, wherein said bent tabs are fixedly secured to said outer profile by brazing.

8. The torque converter as recited in claim 1, wherein said integrated stiffening element has a height and width corresponding to the thickness of said turbine shell.

9. The torque converter as recited in claim 1, wherein said inner profile resists deflection of said turbine.

10. A torque converter having an input means and an output means, comprising:
a cover non-rotatably connected to said input means;
an impeller having an impeller shell non-rotatably connected to said cover, said impeller also having at least one blade fixedly secured to said impeller shell;
a stator having at least one blade fixedly secured thereto; and,
a turbine having a turbine shell non-rotatably connected to said output means, said turbine shell comprising:
an outer profile having at least one blade fixedly secured thereto; and,
an inner profile arranged concentrically within said outer profile, said inner profile comprising:
one or more integrated stiffening elements formed as channels arranged circumferentially about the turbine shell.

11. The torque converter as recited in claim 10, wherein each of said channels are directed in a radially outward direction, from the inner profile toward the outer profile.

12. The torque converter as recited in claim 11, wherein said turbine, impeller, and stator are arranged about said axis of rotation.

13. The torque converter as recited in claim 10, wherein said turbine is non-rotatably connected to said output means via a mounting hub.

14. The torque converter as recited in claim 10, wherein said turbine is further stiffened through a brazing process.

15. A turbine having a turbine shell non-rotatably connected to an output means, said turbine shell comprising:
an outer profile having at least one blade fixedly secured thereto; and,
an inner profile concentrically arranged within said outer profile, said inner profile comprising at least one integrated stiffening element, the at least one integrated stiffening element is formed as an indentation.

16. The turbine as recited in claim 15, wherein said indentation is formed within said turbine.

17. The turbine as recited in claim 15, wherein said indentation is arranged to reduce deflection of the turbine shell along an axis of rotation.

18. The turbine as recited in claim 15, wherein said indentation includes a channel extending radially from said inner profile to said outer profile.

19. The turbine as recited in claim 15, wherein said outer profile and inner profile form an integrated member.

20. The turbine as recited in claim 15, wherein said turbine shell is secured to said output means by a mounting hub.

* * * * *